US00RE43777E

(19) United States
(12) Reissued Patent
Fujimori et al.

(10) Patent Number: US RE43,777 E
(45) Date of Reissued Patent: Oct. 30, 2012

(54) LIGHT SOURCE DEVICE AND PROJECTOR

(75) Inventors: Motoyuki Fujimori, Suwa (JP); Takeshi Takezawa, Matsumoto (JP); Hiroyuki Meguro, Hamamatsu (JP); Masakazu Kitamura, Matsumoto (JP)

(73) Assignee: Seiko Epson Corporation, Tokyo (JP)

(21) Appl. No.: 11/826,189

(22) Filed: Jul. 12, 2007

Related U.S. Patent Documents

Reissue of:
(64) Patent No.: 7,063,423
Issued: Jun. 20, 2006
Appl. No.: 10/833,021
Filed: Apr. 28, 2004

(30) Foreign Application Priority Data

Jun. 16, 2003 (JP) ..... 2003-170447

(51) Int. Cl.

| | |
|---|---|
| ***G03B 21/18*** | (2006.01) |
| ***F21V 29/00*** | (2006.01) |
| ***F21V 7/00*** | (2006.01) |
| ***F21V 7/20*** | (2006.01) |
| ***F21V 9/00*** | (2006.01) |
| ***G03B 21/26*** | (2006.01) |

(52) U.S. Cl. ..... 353/55; 353/54; 353/56; 362/293; 362/294; 362/296.01; 362/345; 362/346; 362/347

(58) Field of Classification Search ..... 353/57, 353/52, 54–56; 362/257, 293, 294, 296, 362/297, 317, 341, 343, 345–347, 296.01
See application file for complete search history.

(56) References Cited

U.S. PATENT DOCUMENTS

| | | | |
|---|---|---|---|
| 1,457,646 | A | 6/1923 | Wilson |
| 5,758,956 | A | 6/1998 | Bornhorst et al. |

FOREIGN PATENT DOCUMENTS

| | | |
|---|---|---|
| EP | 1 722 270 A1 | 11/2006 |
| JP | A 64-84506 | 3/1989 |
| JP | A 3-266824 | 11/1991 |
| JP | A 8-186784 | 7/1996 |
| JP | A 2001-318428 | 11/2001 |
| JP | A-2002-150831 | 5/2002 |
| JP | A 2002-189252 | 7/2002 |
| JP | A-2002-244210 | 8/2002 |
| JP | A 2003-29342 | 1/2003 |
| JP | A 2005-234471 | 9/2005 |

OTHER PUBLICATIONS

Mar. 13, 2012 Office Action issued in Japanese Application No. 2010-065748 (with translation).

*Primary Examiner* — Rochelle-Ann J Blackman
(74) *Attorney, Agent, or Firm* — Oliff & Berridge, PLC

(57) ABSTRACT

A light source lamp unit (10) includes a light source lamp (11), an ellipsoidal reflector (12) and a plate body (19). The plate body (19) is provided behind the reflector (12) with a gap kept therebetween, which has a shape corresponding to the profile of a reflecting portion (122) of the reflector (12). A cooling channel for passing a cooling air is formed between the plate body (19) and the reflector (12). The width of the cooling channel in a direction along an optical axis of the light source lamp (11) is minimized at a part near a neck portion (121) of the reflecting portion (122) and enlarged toward the peripheral edge of the reflecting portion (122) of the reflector (12).

42 Claims, 7 Drawing Sheets

LIGHT SOURCE DEVICE AND PROJECTOR

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a light source device and a projector.

2. Description of Related Art

Conventionally, projectors that form an optical image by modulating a light beam irradiated by a light source in accordance with image information and project the optical image in an enlarged manner are used in the field of home theaters.

The projectors have a light source device having a light source lamp (light-emitting tube), a reflector that reflects a light beam irradiated by the light source lamp and a lamp housing that houses the light source lamp and the reflector.

In recent projectors, in order to clearly display the projected optical image, it is required to increase the luminance of a light source lamp. Since the high-luminance light source lamp causes to raise the temperature inside the lamp housing, the air in the projector is introduced from the upper side of the lamp housing of the light source device to be flown to the lower side thereof to cool the inside of the lamp housing (For instance, see JP08-186784A, page 9, FIG. 7).

In the above cooling method, however, the cooling air flows only from the top to the bottom of the lamp housing, so that it is difficult to equally cool the reflector. Therefore, the reflector may be partly subjected to high temperature. Ordinary, a reflecting film that reflects visible rays and transmits infrared rays and ultraviolet rays of the light beam irradiated from the light source lamp is attached on the reflecting portion of the reflector, but the reflecting film may be peeled off because of the partial high temperature of the reflector.

As disclosed in the above publication, since the reflector and the light source lamp are traditionally housed in the lamp housing, the infrared rays and the ultraviolet rays transmitted through the reflector irradiate the wall of the lamp housing located behind the reflector. The temperature of the wall of the lamp housing then becomes high, thus being thermally deformed. Further, due to ultraviolet rays transmitted through the reflector, the lamp housing may be thermally and chemically decomposed, and accordingly, the wall surface of the lamp housing may be deteriorated and whitened. Additionally, adhesion of siloxane generated by chemical decomposition on optical components may deteriorate the performance thereof, and foul smell caused by generation of endocrine disrupters may lower the reliability.

Incidentally, the above disadvantages are occurred not only when the infrared rays and the ultraviolet rays transmitted through the reflector irradiate the wall of the lamp housing but also when they irradiate the wall of the light guide housing the optical components.

SUMMARY OF THE INVENTION

An object of the present invention is to provide a light source device and a projector having the light source device, the light source device being capable of efficiently cooling a reflector, preventing deformation, deterioration and whitening of a lamp housing and a light guide and inhibiting the generation of siloxane and endocrine disrupters.

A light source device according to an aspect of the present invention, includes: a light-emitting tube including a light-emitting portion that generates light by an electric discharge between electrodes and a first and a second sealing portions provided on both sides of the light-emitting portion; a reflector provided behind the light-emitting portion of the light-emitting tube and having a reflecting portion that irradiates the light beam irradiated by the light-emitting tube after aligning in a predetermined direction, in which the reflecting portion of the reflector reflects visible lights and transmits infrared rays and ultraviolet rays in the light beam irradiated by the light-emitting portion of the light-emitting tube, a plate body is provided behind the reflector spaced apart from the reflecting portion of the reflector with a predetermined gap, the plate body having a shape corresponding to the profile of the reflecting portion of the reflector and absorbing the infrared rays and the ultraviolet rays transmitted through the reflecting portion, and a cooling channel that passes a cooling fluid is formed between the reflecting portion of the reflector and the plate body.

Note that, the plate body is only required to absorb the infrared rays and the ultraviolet rays, which may be coated with anodized black-aluminum on the surface thereof.

With such arrangement, since the plate body with a shape corresponding to the profile of the reflecting portion of the reflector is disposed behind the reflector, and the cooling channel is formed between the plate body and the reflecting portion, the entire reflector can be equally and efficiently cooled. Accordingly, the reflection film attached on the reflecting portion of the reflector can be prevented from peeling off due to the heat.

Further, since the plate body is disposed behind the reflector for the purpose of absorbing the infrared rays and the ultraviolet rays transmitted through the plate body, the infrared rays and the ultraviolet rays etc. do not irradiate the walls of the lamp housing or the light guide located behind the reflector when the light-emitting portion, the reflector and the plate body are housed in the lamp housing or the light guide, thus preventing the wall from being thermally deformed.

Note that, though the plate body generates heat due to the absorption of the infrared rays and the ultraviolet rays, the plate body can be cooled by the air passing through the cooling channel.

Since the ultraviolet rays etc. do not irradiate the walls of the lamp housing or the light guide located behind the reflector, the lamp housing or the light guide is not thermally or chemically decomposed, thus preventing the lamp housing or the light guide from being deteriorated and whitened. Because the lamp housing or the light guide is not chemically decomposed, generation of siloxane and endocrine disrupters can be avoided. Accordingly, degradation of the performance of the optical components due to adhesion of siloxane on the optical components, and a low reliability due to generation of foul smell along with generation of endocrine disrupters can be dissolved.

Furthermore, an exhaust fan is ordinarily provided in the exterior case of the projector that houses a light source device etc. in order to cool the light source device by introducing the air in the exterior case into the light source device, and the air introduced by the exhaust fan is discharged from an exhaust port formed on the exterior case. A plurality of louvers conventionally attached to the exhaust port at close intervals in order to inhibit the light leakage from the light source device. When the air is discharged from the exhaust port, since the considerable air resistance is generated against the louvers, the revolution number of the exhaust fan must be raised for efficiently cooling the light source device, thus not lowering the noise level.

In contrast, with the arrangement of the present invention, since the plate body having a shape corresponding to the profile of the reflecting portion is provided behind the reflector, the light beam emitted by the light-emitting portion of the light-emitting tube is prevented from leaking to the backside of the reflector. Therefore, the louvers attached on the exhaust port of the exterior case are not required to be arranged at close intervals, thus reducing the air resistance of the louvers. Accordingly, the revolution number of the exhaust fan can be set low, thus lowering the noise level.

Though it is conventionally required that a reflector and a, light-emitting tube are entirely covered by a lamp housing for preventing the light emitted by the light-emitting tube from leaking to the backside of the reflector, in the arrangement of the present invention, the light emitted by the light-emitting tube is prevented from leaking to the backside of the reflector by the plate body and the lamp housing need not to cover the backside of the reflector, thus downsizing the lamp housing.

Further, since the plate body is provided behind the reflector, the broken pieces of the light-emitting tube are prevented from scattering to the backside of the reflector even when the light-emitting tube is exploded. Thus, the safety of the light source device can be enhanced.

In the above aspect of the present invention, the light source device may preferably include: a neck portion provided on the reflecting portion of the reflector to support the sealing portion of the light-emitting portion, in which the width of the cooling channel formed between the reflecting portion of the reflector and the plate body along an optical axis direction of the light-emitting portion may preferably be minimized at a part near the neck portion of the reflecting portion and enlarged toward a peripheral edge of the reflector.

With this arrangement, the width of the cooling channel is enlarged toward the peripheral edge of the reflector, thus promoting the cooling air to be introduced from or discharged toward the peripheral edge of the reflector.

In the above aspect of the present invention, the minimum width of the cooling channel may preferably be from 5 to 15 mm.

If the minimum width of the cooling channel is less than 5 mm, the cooling air is difficult to pass through the cooling channel and the reflector and the plate body may not be sufficiently cooled because the cooling channel is so narrow that great air passage resistance is developed therein.

If the minimum dimension is more than 15 mm, the cooling efficiency may be lowered since the cooling channel is so wide that turbulence is likely to be generated, thereby restricting the flow of the fluid along the reflector and the plate body.

With this arrangement, since the minimum width of the cooling channel is from 5 to 15 mm, the above disadvantages can be avoided, thus efficiently cooling the reflector and the plate body.

In the above aspect of the present invention, the surface of the plate body may preferably have irregularities on a side near the reflector.

The heat of the plate body generated by absorbing the ultraviolet rays and the infrared rays is cooled by the cooling fluid passing through the cooling channel. In this arrangement, since the surface of the plate body has irregularities on the side near the reflector, the heat radiation area of the plate body can be widely secured, thus efficiently radiating the absorbed heat.

In the above aspect of the present invention, the surface emissivity of the surface of the plate body may preferably be 0.8 or above on a side near the reflector.

Since the surface emissivity of the plate body is 0.8 or above, the heat absorbed by the plate body can be efficiently radiated.

In the above aspect of the present invention, the light source device may further includes a neck portion provided on the reflecting portion of the reflector to support the sealing portion of the light-emitting portion, in which the plate body may preferably be made of a heat-conductive material and fixed on the neck portion of the reflector.

With this arrangement, by attaching the plate body made of the heat-conductive material on the neck portion, the heat of the reflector can be transferred to the plate body to cool the reflector.

In the above aspect of the present invention, in the sealing portions of the light-emitting tube the one sealing portion provided on a side near the reflector may preferably be fixed on the reflector via a cylindrical heat-conductive member with one end of the heat-conductive member extending behind the reflector, and the plate body may preferably be made of a heat-conductive material and be abutted on an end thereof.

With this arrangement, since the cylindrical heat-conductive member is attached to the sealing portion of the light-emitting tube, the light-emitting portion can be cooled by transferring the heat generated by the light-emitting portion of the light-emitting tube to the heat-conductive member.

By abutting the plate body made of the heat-conductive material to the heat-conductive member, the heat transferred to the heat-conductive member can be radiated via the plate body. Accordingly, the light-emitting portion of the light-emitting tube can be efficiently cooled via the heat-conductive member and the plate body.

A projector according to another aspect of the present invention forms an optical image by modulating a light beam irradiated by a light source in accordance with image information and projects the optical image in an enlarged manner, the projector including the above-described light source device.

Since the projector has the light source including any one of features described above, the same advantages as the above light source device can be obtained. In other words, advantages that the reflector can be efficiently cooled and the lamp housing or the light guide can be prevented from being thermally deformed can be obtained.

DETAILED DESCRIPTION OF PREFERRED EMBODIMENT(S)

An embodiment of the present invention will be described below with reference to the attached drawings.

Figure 1:
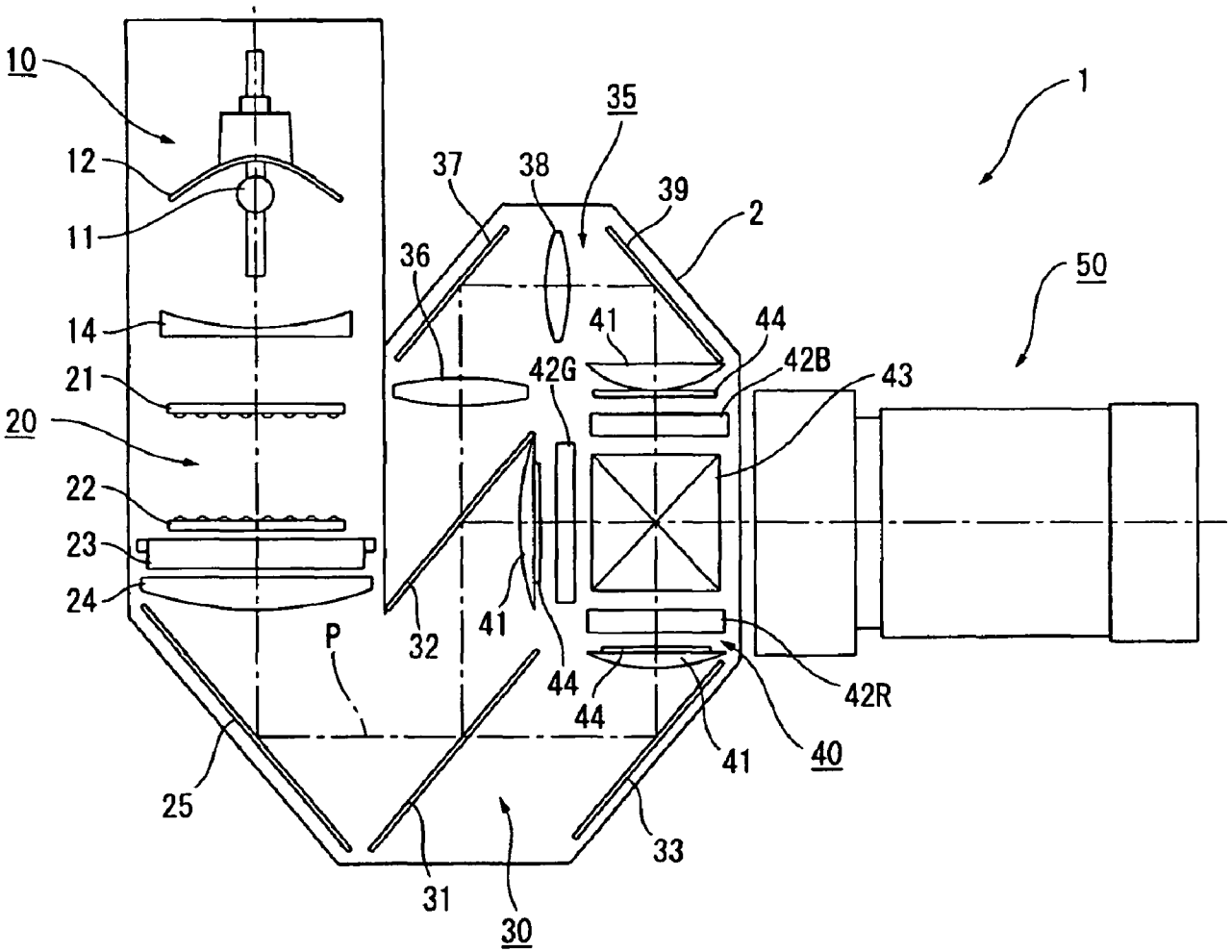
FIG. 1 is a schematic illustration showing an optical system of a projector according to an embodiment of the present invention.

FIG. 1 is a schematic illustration showing an optical system of a projector 1 according to an embodiment of the present invention. The projector 1 is an optical equipment that forms an optical image by modulating a light beam irradiated by a light source in accordance with image information and projects the optical image on a screen in an enlarged manner, the projector 1 including a light source lamp unit 10 (light source device), a uniform illumination optical system 20, a color-separating optical system 30, a relay optical system 35, an optical device 40 and a projection optical system 50. Optical elements of the optical systems 20 through 35 are housed with the positions thereof being adjusted within a light guide 2 where a predetermined illumination optical axis P is set. Though not shown, the light guide 2 includes a box-shaped lower light guide opened at the upper face thereof and a lid-shaped upper light guide closing the opening of the lower light guide.

The light source lamp unit 10 emits the light beam irradiated by the light source lamp 11 after aligning in a predetermined direction to illuminate the light source device 40, and includes a light source lamp (light-emitting tube) 11, an ellipsoidal reflector 12 and a collimating concave lens 14, of which details will be described below.

The light beam irradiated by the light source lamp 11 is emitted as a convergent light after the irradiating direction thereof being aligned toward the front side of the optical device by the ellipsoidal reflector 12, which is collimated by the collimating concave lens 14 to be irradiated to the uniform illumination optical system 20.

The uniform illumination optical system 20 is an optical system for separating the light beam irradiated by the light source lamp unit 10 into a plurality of sub-beams to equalize the in-plane illuminance of an illuminating area, the uniform illumination optical system 20 including a first lens array 21, a second lens array 22, a polarization converter 23, a superposing lens 24 and a reflection mirror 25.

The first lens array 21 functions as a light beam separating optical element that separates the light beam irradiated by the light source lamp 11 into a plurality of sub-beams, which has a plurality of small lenses arranged in a matrix on a plane orthogonal to the illumination optical axis P, each profile of the respective small lenses being arranged to be approximately similar to the profile of image formation areas of liquid crystal panels 42R, 42G, 42B of the optical device 40 (described below).

The second lens array 22 is an optical element for condensing the plurality of sub-beams separated by the above first lens array 21, which has small lenses arranged in a matrix on a plane orthogonal to the illumination optical axis P as the first lens array 21, however, each profile of the respective small lenses is not required to correspond with the profile of the image formation areas of the liquid crystal panels 42R, 42G, 42B since the second lens array 22 is for condensing the light.

The polarization converter 23 aligns a polarizing direction of the respective sub-beams separated by the first lens array 21 into a linear polarized light of a predetermined direction.

Though not shown, the polarization converter 23 has an alternate arrangement of a polarization separating film and a reflection mirror both inclined relative to the illumination optical axis P. The polarization separating film transmits either P-polarized light beam or S-polarized light beam contained in the respective sub-beams whereas reflects the other polarized light beam. The reflected polarized light beam is bent by the reflection mirror to be irradiated in a direction to which the transmitted polarized light beam is irradiated, i.e., in a direction along the illumination optical axis P. One of the irradiated P-polarized light beam and the S-polarized light beam is converted by a retardation plate provided on a light irradiation side of the polarization converter 23 so that the direction of all polarized light beam is aligned. With the use of such polarization converter 23, the light beam irradiated by the light source lamp 11 can be aligned as the polarized light beam in a predetermined direction, so that the utilization ratio of the source light to be used in the optical device 40 can be enhanced.

The superposing lens 24 is an optical element that condenses the plurality of sub-beams after passing the first lens array 21, the second lens array 22 and the polarization converter 23 to superpose the condensed light beam on the image formation areas of the liquid crystal panels 42R, 42G, 42B. Though the superposing lens 24 is a spherical lens in the present embodiment, a light transmitting area there of having a flat light incident side of and a spherical light irradiation side, an aspherical lens may alternatively be used.

The light beam irradiated by the superposing lens 24 is bent by the reflection mirror 25 and irradiated to the color-separating optical system 30.

The color-separating optical system 30 has two dichroic mirrors 31 and 32 and a reflection mirror 33, the dichroic mirrors 31 and 32 separating the plurality of sub-beams irradiated by the uniform illumination optical system 20 into three color lights of red (R), green (G) and blue (B).

The dichroic mirrors 31 and 32 are optical elements each having a base on which a wavelength-selection film that reflects a light beam of a predetermined wavelength and transmits a light beam of the other wavelength is formed, in which the dichroic mirror 31 disposed on the upstream of the optical path is a mirror that transmits the red light and reflects other color lights. The dichroic mirror 32 disposed on the downstream of the optical path is a mirror that reflects the green light and transmits the blue light.

The relay optical system 35 has an incident-side lens 36, a relay lens 38, and reflection mirrors 37 and 39, which guides the blue light transmitted through the dichroic mirror 32 of the color-separating optical system 30 to the optical device 40. Incidentally, the relay optical system 35 is used for the optical path of the blue light in order to avoid deterioration in the light utilization efficiency on account of light dispersion and the like caused by the longer length of the optical path of the blue light than the optical path of other color lights. Though such arrangement is used in the present embodiment because of the longer optical path of the blue light, the optical path of the red light may alternatively be lengthened.

The red light separated by the above-described dichroic mirror 31 is bent by the reflection mirror 33 and, subsequently, fed to the optical device 40 through a field lenses 41. The green light separated by the dichroic mirror 32 is directly fed to the optical device 40 through the field lenses 41. The blue light is condensed and bent by the lenses 36, 38 and the reflection mirrors 37 and 39 of the relay optical system 35 to be fed to the optical device 40 through the field lenses 41. Incidentally, the field lenses 41 provided on the upstream of the optical path of the respective color lights of the optical device 40 are provided for converting the respective sub-beams irradiated by the second lens array 22 into light beams parallel to the illumination optical axis.

The optical device 40 forms a color image by modulating the incident light beam in accordance with image information, the optical device 40 including liquid crystal panels 42

(optical modulator) to be illuminated and a cross dichroic prism 43 (color-combining optical system). In addition, incident-side polarization plates 44 are respectively interposed between the field lenses 41 and the liquid crystal panels 42R, 42G, 42B, and though not shown, irradiation-side polarization plates are respectively interposed between the liquid crystal panels 42R, 42G, 42B and the cross dichroic prisms 43 so as to modulate the respective incident color lights through the incident-side polarization plates 44, the liquid crystal panels 42R, 42G, 42B and the irradiation-side polarization plates.

The liquid crystal panels 42R, 42G, 42B each have a pair of transparent glass substrates with liquid crystal as electrooptic material sealed therebetween to modulate the polarizing direction of the polarized light beam irradiated by each incident-side polarization plate 44 in accordance with given image signal by using, for instance, a polycrystalline silicon TFT as a switching element. Each image formation area of the liquid crystal panels 42R, 42G, 42B for modulation has a rectangular shape having diagonal length of 0.7 inch.

The cross dichroic prism 43 is an optical element that combines the optical image irradiated by the irradiation-side polarization plates and modulated for each color light to form a color image. The cross dichroic prism 43 contains four right-angle prisms mutually bonded in an approximately planarly-viewed square. Dielectric multi-layer films are formed on the boundaries where the four right-angle prisms are mutually bonded. One of the X-shaped dielectric multi-layer films reflects the red light and the other one reflects the blue light, the red light and the blue light being bent by the dielectric multi-layer films and aligned with the advancement direction of the green light, so that the three color lights are combined.

The color image irradiated by the cross dichroic prism 43 is projected by the projection optical system 50 in an enlarged manner to form a large-size image on a screen (not shown).

The above-described light source lamp unit 10 (light source device) is attachable to and detachable from the light guide 2 so as to be replaced when the light source lamp 11 being exploded or the luminance thereof being deteriorated due to its life-span.

Figure 2:
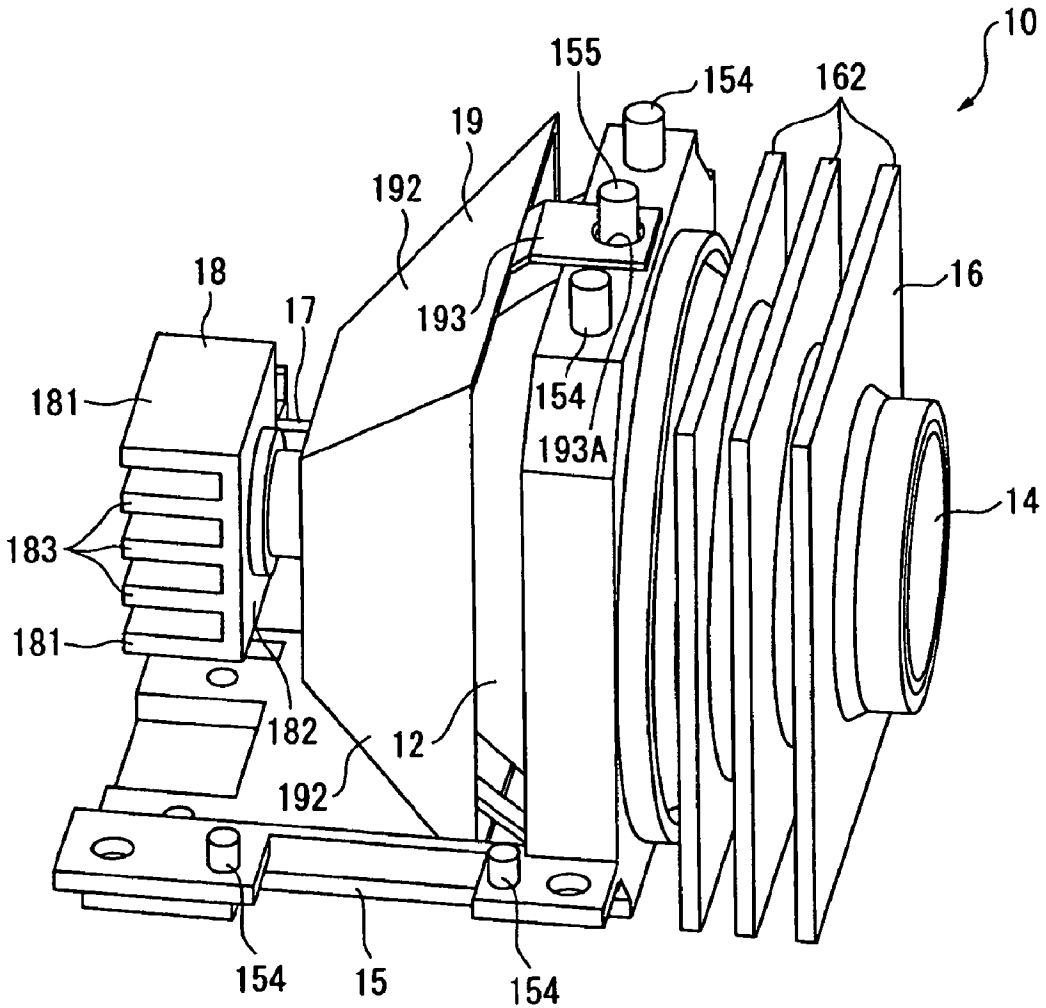
FIG. 2 is a perspective view showing an outline of a light source device of the aforesaid embodiment.
Figure 3:
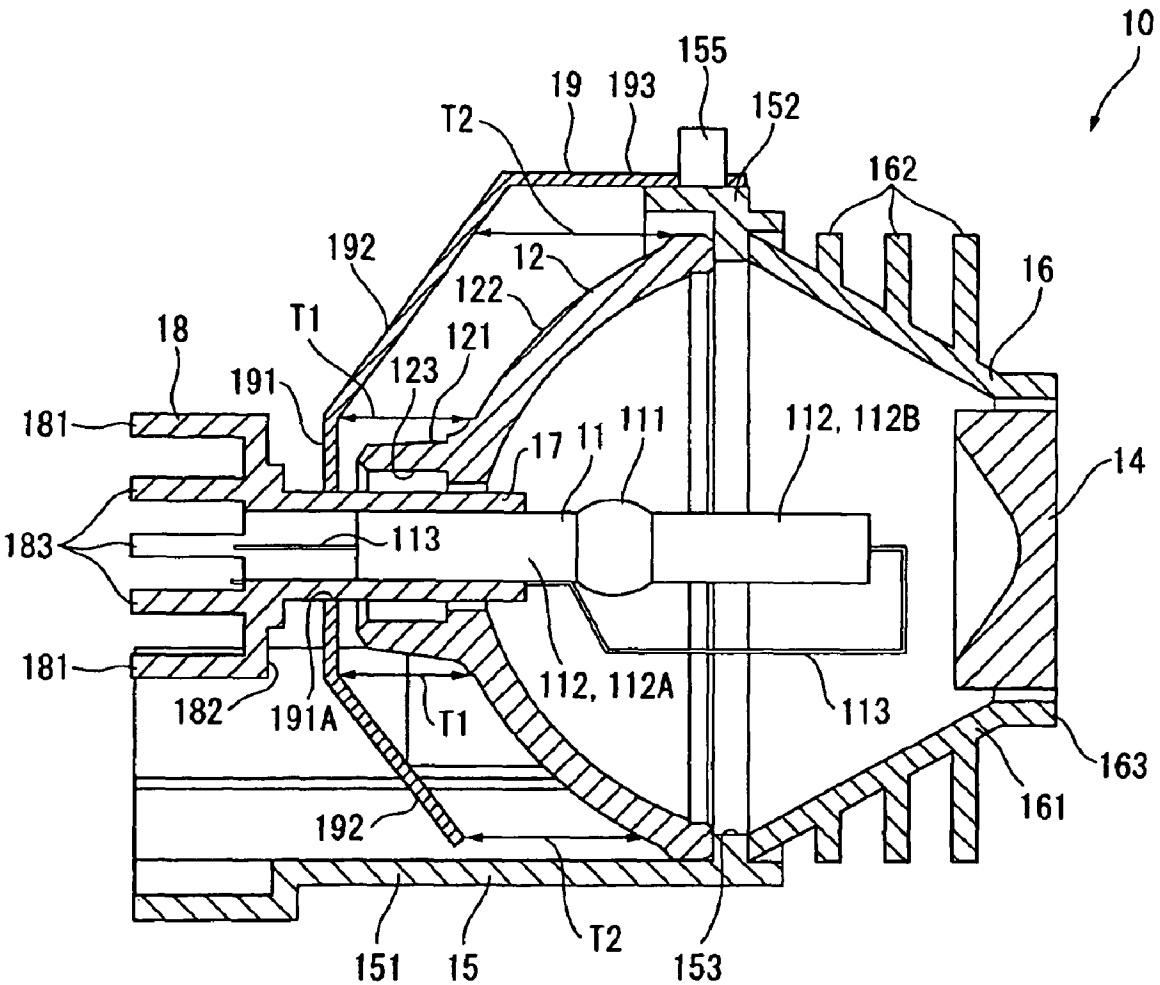
FIG. 3 is a cross sectional view showing the structure of the light source device of the aforesaid embodiment.

More specifically, as shown in FIGS. 2 and 3, the light source lamp unit 10 includes a lamp housing 15, a cover portion 16, a heat-conductive member 17, a heat-radiation fin 18 and a plate body 19 along with the above-described light source lamp 11, the ellipsoidal reflector 12 and the collimating concave lens 14.

The light source lamp 11 as a light-emitting tube has a silica glass tube with the central portion thereof being spherically bulged, the central portion being a light-emitting portion 111 and the portions extending on both sides of the light-emitting portion 111 being sealing portions 112. In the embodiment, one of the sealing portions 112 on the side near the ellipsoidal reflector 12 is a first sealing portion 112A whereas the other one is a second sealing portion 112B.

Though not shown in FIG. 3, a pair of tungsten electrodes spaced apart with each other, mercury, rare gas and a small amount of halogen are sealed in the light-emitting portion 111.

The sealing portions 112 are sealed by glass material etc. with metal foil of molybdenum being inserted therein, the metal foil being electrically connected with the electrodes in the light-emitting portion 111. The metal foil is connected to a lead wire 113 as an electrode outgoing line, the lead wire 113 extending to the outside of the light source lamp 11.

When a predetermined voltage is applied on the lead wire 113, electric discharge is generated between the pair of electrodes and the light-emitting portion 111 emits light.

The ellipsoidal reflector 12 is an integral glass molding including an ellipsoidal curved reflecting portion 122 that irradiates the light beam irradiated by the light source lamp 11 after aligning the light beam in a predetermined direction and a neck portion 121 provided on the reflecting portion 122 for the first sealing portion 112A of the light source lamp 11 to be inserted.

An insertion hole 123 is formed on the neck portion 121 at the center, and the first sealing portion 112A is disposed at the center of the insertion hole 123. Note that, the first sealing portion 112A is supported by and fixed on the neck portion 121 via the below-described heat-conductive member 17.

The reflecting portion 122 is formed by vacuum evaporation of a metal thin film on the ellipsoidal curved glass surface, and though not shown, a reflection film (cold mirror) that reflects visible lights and transmits infrared rays is attached on the reflection surface of the reflecting portion 122.

The above light source lamp 11 is arranged inside the reflecting portion 122 so that the light-emission center between the pair of electrodes in the light-emitting portion 111 is coincident with the first focal position of the ellipsoidal curve of the reflecting portion 122.

Once the light source lamp 11 is lit, the light beam emitted by the light-emitting portion 111 is reflected by the reflection surface of the reflecting portion 122 to be a convergent light converged on the second focal position of the ellipsoidal curve.

When the light source lamp 11 is fixed on such ellipsoidal reflector 12, the first sealing portion 112A on which the below-described heat-conductive member 17 is attached is inserted into the insertion hole 123 of the ellipsoidal reflector 12 and positioned so that the light-emission center between the pair of electrodes in the light-emitting portion 111 is coincident with the focal position of the ellipsoidal curve of the reflecting portion 122 and a silica-alumina inorganic adhesive is filled inside the insertion hole 123. In the embodiment, the lead wire 113 outgoing from the second sealing portion 112B is also exposed to the outside through the insertion hole 123.

The dimension of the reflecting portion 122 in the optical axis direction is shorter than the length of the light source lamp 11, so that when the light source lamp 11 is fixed on the ellipsoidal reflector 12, the second sealing portion 112B of the light source lamp 11 projects from a light incident opening of the ellipsoidal reflector 12, because The heat-conductive member 17 is a cylindrical component attached on the outside of the first sealing portion 112A of the light source lamp 11, the heat-conductive member 17 being inserted through the neck portion 121 of the ellipsoidal reflector 12 together with the first sealing portion 112A to be fixed.

The heat-conductive member 17 and the first sealing portion 112A are adhered by an inorganic adhesive (not shown) having high thermal conductivity such as a silica-alumina or aluminum nitride adhesive. Though not shown, a slit is cut on the heat-conductive member 17 along its longitudinal direction, the slit allowing thermal expansion of the first sealing portion 112A.

Any material may be used for the heat-conductive member 17 as long as the material has higher thermal conductivity than the thermal conductivity of the light source lamp 11, which may preferably be a material with thermal conductivity of 5 W/(m·K) or higher such as sapphire, quartz crystal, fluorite, alumina and aluminum nitride.

A first end of the heat-conductive member 17 extends from the neck portion 121 of the reflector 12 to the backside of the reflector 12 to be exposed from the reflector 12. On the other hand, a second end extends to the part near the light-emitting portion 111 of the light source lamp 11.

The heat-radiation fin 18 is integrally formed with the heat-conducive member 17 at the first end.

The heat-radiation fin 18 has an approximately planarly-viewed C-shape composed of mutually opposing planarly-viewed rectangular first walls 181 and a planarly-viewed rectangular second wall 182 that connects proximal ends of the first walls 181, which is disposed so that an opening formed at the side opposing to the second wall 182 faces the reflector 12. Three pieces 183 extending from the second wall 182 toward the opening are disposed between the first walls 181 approximately in parallel to the first walls 181.

In the embodiment, though the heat-radiation fin 18 is provided on the heat-conductive member 17, the heat-radiation fin may not be provided.

The plate body 19 is disposed behind the reflector 12 (a side opposite to the light reflection side) spaced apart from the reflector 12 and formed in a shape corresponding to the profile of the reflecting portion 122 of the reflector 12, for instance, in a truncated pyramid. Specifically, the plate body 19 of the embodiment has a through hole 191A, into which the heat conductive member 17 is inserted through, the plate body 19 including a planarly-viewed rectangular first side 191 being approximately orthogonal to the longitudinal direction of the light source lamp 11 and four second sides 192 extending from the respective edges of the first side 191 to the side of the opening of the reflector 12.

In this embodiment, though the plate body is formed in a truncated pyramid, the plate body may be formed in a six-sided truncated pyramid, or in an ellipsoidal curved shape approximately the same as the reflecting portion 122 of the reflector 12.

When the heat-conductive member 17 is inserted through the through hole 191A of the first side 191, the plate body 19 is abutted on the heat-conductive member 17.

One of four second sides 192 located on the upper side of the reflector 12 is integrally formed with a fixing piece 193 for fixing the plate body 19 on a vertical portion 152 (described below) of the lamp housing 15. A through hole 193A is formed on the fixing portion 193 so that the plate body 19 is fixed on the lamp housing 15 by inserting a projection 155 of the vertical portion 152 through the through hole 193A.

A cooling channel for passing the cooling air is provided between the plate body 19 and the reflector 12. The width of the cooling channel in a direction along the optical axis of the light source lamp 11 is minimized around the neck portion 121 of the reflecting portion 122 and enlarged toward the peripheral edge of the reflecting portion 122 of the reflector 12. In other words, the dimension (T1 in FIG. 3) between the first side 191 and a part near the neck portion 121 of the reflecting portion 122 is the smallest whereas the dimension (T2 in FIG. 3) between the peripheral edge of the second sides 192 and the peripheral edge of the reflecting portion 122 is the largest. The dimension (T1 in FIG. 3) between the first side 191 and the part near the neck portion 121 of the reflecting portion 122 is from 5 to 15 mm, preferably around 10 mm.

The plate body 19 absorbs ultraviolet rays and infrared rays and is made of a heat-conductive material such as an aluminum alloy, which surface is coated with anodized black-aluminum. Further, the surface of the first side 191 and the second sides 192 have irregularities on the side near the reflector 12, to have 0.8 surface emissivity.

As shown in FIG. 3, the lamp housing 15 is an integral synthetic resin molding with an L-shaped cross section, the lamp housing 15 having a horizontal portion 151 and the vertical portion 152.

The horizontal portion 151 engages with the wall of the light guide 2 to conceal the light source lamp unit 10 within the light guide 2 to prevent light leakage. Though not shown, the horizontal portion 151 has a terminal block for electrically connecting the light source lamp 11 to an external power source, the terminal block being connected to the lead wire 113 of the light source lamp 11.

The vertical portion 152 is a part for positioning the ellipsoidal reflector 12 in the optical axis direction, in the embodiment, the distal end of the ellipsoidal reflector 12 at the side of the light irradiation opening being fixed to the vertical portion 152 by an adhesive. An opening 153 that transmits the light beam irradiated by the ellipsoidal reflector 12 is formed on the vertical portion 152.

Further, projections 154 are provided on the horizontal portion 151 and the vertical portion 153. The projections 154 respectively engage with recesses inside the light guide 2 so that the light-emission center of the light source lamp 11 is located on the illumination optical axis P.

Further, a projection 155 is formed on the vertical portion 152 at the upper side for inserting through the through hole 193A of the fixing piece 193 of the plate body 19.

The cover portion 16 is an integral metal molding having a heat absorber 161 formed in an approximately conical cylinder attached to the opening 153 of the vertical portion 152 of the lamp housing 15, a plurality of heat-radiation fins 162 projected outside the heat absorber 161 and a lens attachment 163 formed on a distal end of the heat absorber 161.

The heat absorber 161 absorbs radiant heat of the light source lamp 11 and convection heat in the sealed area surrounded by the ellipsoidal reflector 12 and the cover portion 16, the inside of the heat absorber 161 being coated with anodized black-aluminum. The approximately conical slant surface of the heat absorber 161 is parallel to the inclination of the convergent light of the ellipsoidal reflector 12 to inhibit the light beam irradiated by the ellipsoidal reflector 12 from being irradiated on the interior surface of the heat absorber 161.

The plurality of the heat-radiation fins 162 are plate bodies extending in the direction orthogonal to the optical axis of the light source lamp unit 10, where gaps for sufficiently passing the cooling air are formed between the heat-radiation fins 162.

The lens attachment 163 is defined by a cylindrical part protruded on the distal end of the heat absorber 161 and the collimating concave lens 14 for collimating the convergent light of the ellipsoidal reflector 12 is attached to the cylindrical part. Though not shown, the collimating concave lens 14 is fixed to the lens attachment 163 by an adhesive. When the collimating concave lens 14 is attached to the lens attachment 163, the area inside the light source lamp unit 10 is completely sealed, so that the broken pieces of the light source lamp 11 are not scattered to the outside if being exploded even when the light source lamp 11 is exploded.

The above-described light source lamp unit 10 is housed in the light guide 2 of the projector 1.

Though not shown in FIG. 1, the projector 1 includes an exhaust fan arranged adjacent to the light source lamp unit 10, in which the exhaust fan draws in the cooling air inside the projector 1, blows the cooling air along the extending direction of the heat-radiation fin 162 of the cover portion 16, passes the cooling air through the cooling channel formed between the plate body 19 and the reflector 12 and further blows the cooling air to the heat-conductive member 17 and the heat-radiation fin 18. Additionally, an exhaust port for discharging the air from the exhaust fan is provided on an exterior case (not shown) of the projector 1, a light shielding louvers being attached on the exhaust port.

Next, cooling process of the light source lamp unit 10 according to the projector 1 will be described.

When the projector 1 is powered so the light source lamp 11 is lit, a white light is irradiated. At this time, the exhaust fan inside the projector 1 is driven.

The heat generated by the light-emitting portion 111 of the light source lamp 11 is transferred to the heat-conductive member 17 via the first sealing portion 112A. Heat is exchanged between a part of the heat transferred to the heat-conductive member 17 and the cooling air in the exterior case drawn in by the exhaust fan to cool the heat-conductive member 17.

Another part of the heat transferred to the heat-conductive member 17 is transferred to the heat-radiation fin 18, and heat is exchanged between the heat-radiation fin 18 and the cooling air so that the heat is radiated from the heat-radiation fin 18.

Still another part of the heat transferred to the heat-conductive member 17 is transferred to the plate body 19 fixed on the heat-conductive member 17, and heat is exchanged between the plate body 19 and the air passing through the cooling channel formed between the plate body 19 and the reflector 12.

The heat is also generated on the reflector 12 that reflects the light beam emitted by the light-emitting portion 111. The heat of the reflector 12 is exchanged into the cooling air passing through the cooling channel formed between the reflector 12 and the plate body 19 so as to cool the reflector 12.

Further, the light source lamp unit 10 generates heat due to the absorption of the infrared rays and the ultraviolet rays irradiated by the light-emitting portion 111. A method of cooling the heat will be described below.

The infrared rays and the ultraviolet rays radiated from the light-emitting portion 111 to the backside thereof are transmitted through the reflector 12 and absorbed by the plate body 19 to generate the heat at the plate body 19. The heat is exchanged into the cooling air passing through the cooling channel formed between the plate body 19 and the reflector 12 to cool the plate body 19.

Incidentally, approximately 30% of the ultraviolet rays and the infrared rays irradiated by the light-emitting portion 111 transmit through the reflector 12.

On the other hand, the infrared rays and the ultraviolet rays radiated forward the light-emitting portion 111 are absorbed by the heat absorber 161 of the cover portion 16. The air heated by radiant heat of the light source lamp 11 causes convection inside, and heat is exchanged between the heated air and the inner circumference of the heat absorber 161 of the cover portion 16, thereby absorbing the heat to be cooled. The heat absorbed by the heat absorber 161 is transferred to the heat-radiation fin 162, and heat exchange is occurred with the cooling blast from the cooling fan to cool the heat-radiation fin.

According to the present embodiment, following advantages can be obtained.

(1) Since the plate body 19 having a shape corresponding to the profile of the reflecting portion 122 of the reflector 12 is disposed behind the reflector 12 and the cooling channel is formed between the plate body 19 and the reflecting portion 122, the entire reflector 12 can be equally and efficiently cooled. Since the reflector 12 can be equally cooled, the reflection film attached on the reflecting portion 122 of the reflector 12 is not peeled off on account of heat.

(2) Since the plate body 19 disposed behind the reflector 12 serves to absorb the infrared rays and the ultraviolet rays transmitted through the reflecting portion 122 of the reflector 12, the infrared rays and the ultraviolet rays do not irradiate the wall of the light guide 2 located behind the reflector 12 even when the light source lamp unit 10 is housed in the light guide 2. Therefore, the wall of the light guide 2 can be prevented from being thermally deformed.

Note that, though heat is generated at the plate body 19 due to absorption of the ultraviolet rays and the infrared rays, the plate body 19 can be cooled by the air passing thorough the cooling channel.

(3) Since the ultraviolet rays etc. do not irradiate the wall of the light guide 2 located behind the reflector 12, the light guide 2 is not thermally nor chemically decomposed, thus preventing the light guide 2 from being deteriorated or whitened. Because the light guide 2 is not chemically decomposed, generation of siloxane or endocrine disrupters can be avoided. Accordingly, deterioration of the performance of the optical components due to adhesion of siloxane on the optical components, and low reliability due to generation of foul smell in accordance with generation of endocrine disrupters can be dissolved.

(4) Since the plate body 19 formed in a shape corresponding to the profile of the reflecting portion 122 is provided behind the reflector 12, the light beam emitted by the light-emitting portion 111 of the light source lamp 11 can be prevented from leaking to the backside of the reflector 12. Therefore, the louvers are not required to be thickly arranged on the exhaust port of the exterior case for inhibiting the light leakage, thus reducing the air resistance of the louvers and facilitating the discharge of the air sent from the exhaust fan. Accordingly, the revolution number of the exhaust fan for cooling the light source lamp 11 can be set low, thus lowering the noise level.

(5) Conventionally, in order to prevent the light of the light source lamp 11 from leaking to the backside or the front side of the reflector 12, a lamp housing needs to entirely cover the reflector 12 and the light source lamp 11. On the other hand, in this embodiment, since the plate body 19 is provided behind the reflector 12 and the cover portion 16 is provided at the front side of the reflector 12, the light leakage from the light source lamp 11 can be prevented. Accordingly, the lamp housing 15 need not to be formed to entirely cover the reflector 12 and the light source lamp 11, thus reducing the size of the lamp housing 15.

(6) Further, the cover portion 16 is provided on the front side of the reflector 12 and the plate body 19 is provided behind the reflector 12, thereby preventing the broken pieces of the light source lamp 11 from scattering to the front side and the backside of the reflector 11 even when the light source lamp 12 is exploded. Therefore, the safety of the light source lamp unit 10 can be enhanced.

Particularly, since the cover portion 16 provided on the front of the reflector 12 has a completely sealed anti-explosion structure with the safety can be further improved. Specifically, since the cover portion 16 is made of a metal having excellent heat-conductivity so that radiant heat generated by the light source lamp 11 can be absorbed by the heat absorber 161 and radiated from the heat-radiation fin 162, a vent hole etc. for cooling the inside of the cover portion 16 is not necessary, thus allowing the cover portion 16 to be completely sealed.

(7) The width of the cooling channel formed between the reflector 12 and the plate body 19 is enlarged toward the peripheral edge of the reflector 12, thus promoting the cooling air to be introduced from or discharged to the peripheral edge side of the reflector 12. In other words, the exhaust fan provided adjacent to the reflector 12 allows sufficient air to pass through the cooling channel to be discharged via the exhaust fan, thus efficiently cooling the reflector 12 and the plate body 19.

(8) If the minimum width of the cooling channel is less than 5 mm, the cooling air is difficult to be passed through the cooling channel and unavailable to sufficiently cool the reflector and the plate body because the cooling channel is so narrow that the air resistance is caused in the passage. If the minimum width is more than 15 mm, the cooling air is difficult to flow along the reflector and the plate body so that the cooling efficiency may be lowered due to because the cooling channel is so wide that the turbulent flow is likely caused. In contrast, in the embodiment, since the width of the cooling channel is from 5 to 15 mm, sufficient cooling air can pass through the cooling channel and the turbulent flow can be prevented, so that the reflector 12 and the plate body 19 can be sufficiently cooled.

(9) In this embodiment, since the surface of the plate body 19 has irregularities on the side near the reflector 12, the heat radiation area of the plate body 19 can be widely secured, thus efficiently radiating the absorbed heat. Further, since the surface emissivity of the surface of the plate body 19 is 0.8 or above, the heat generated on the plate body 19 by absorbing the ultraviolet rays and the infrared rays can be efficiently radiated, and the heat can be efficiently exchanged with the air passing through the cooling channel.

(10) Since the cylindrical heat-conductive member 17 is attached to the sealing portion 112A of the light source lamp 11, the heat of the light-emitting portion 111 of the light source lamp 11 is transferred from the sealing portion 112A to the heat-conductive member 17, thus cooling the light-emitting portion 111.

By abutting the heat-conductive plate body 19 to the heat-conductive member 17, the heat transferred to the heat-conductive member 17 can be radiated via the plate body 19. Therefore, the light-emitting portion 111 of the light source lamp 11 can be efficiently cooled via the heat-conductive member 17 and the plate body 19.

Incidentally, the scope of the present invention is not restricted to the above-described embodiment, but includes modifications and improvements as long as an object of the present invention can be achieved.

For example, in the above embodiment, though the heat-conductive member 17 is attached to the first sealing portion 112A of the light source lamp 11, the heat-conductive member 17 may not be provided. Accordingly, the number of the components can be reduced. In such case, the plate body 19 may be fixed on the neck portion 121 of the reflector 12. With this arrangement, the heat of the reflector 12 can be transferred to and. radiated from the plate body 19.

In the above embodiment, though the surface emissivity on the side near the reflector 12 of the plate body 19 is 0.8 or above, the surface emissivity may be below 0.8. Further, though the surface of the plate body 19 has irregularities on the side near the reflector 12, irregularities may not be provided. Accordingly, the manufacturing process of the plate body can be facilitated.

Additionally, though the minimum width of the cooling channel is from 5 to 15 mm in the above embodiment, the minimum width is not limited thereto and may be less than 5 mm or more than 15 mm. In the above embodiment, though the width of the cooling channel is enlarged toward the peripheral edge of the reflector 12, the cooling channel may have a uniform width.

Further, a sub-reflection mirror, i.e. a reflection member that covers substantially half of the front side (in the light irradiation direction) of the light-emitting portion 111 of the light source lamp 11 may be provided on the light-emitting portion 111 of the light source lamp 11.

By attaching the sub-reflection mirror to the light-emitting portion 111, the light emitted to the front side of the light-emitting portion 111 is reflected by the sub-reflection mirror toward the ellipsoidal reflector 12 to be irradiated from the reflecting portion 122 of the ellipsoidal reflector 12.

With the use of the sub-reflection mirror, since the light beam emitted to the front side of the light-emitting portion 111 is reflected to the backside thereof, all of the light beams irradiated by the light emitting portion 111 can be irradiated after being aligned in a predetermined direction even when the reflecting portion 122 has a small ellipsoidal curved surface, thus reducing the dimension of the ellipsoidal reflector 12 in an optical axis direction.

Furthermore, in the above embodiment, though the cover portion 16 is attached on the reflector 12 on the side of the opening, the cover portion 16 may not be provided. In such case, a light guide may cover the front of the reflector 12 to inhibit the light leakage from the light source lamp 11.

In the above embodiment, though the lamp housing 15 has a L-shaped cross section, the lamp housing 15 may be box-shaped. When the lamp housing 15 is box-shaped, since the plate body 19 is provided behind the reflector 12, the ultraviolet rays and the infrared rays do not irradiate the wall of the lamp housing, thus preventing the lamp housing from being thermally deformed and thermally and chemically decomposed.

In the above embodiment, though the light source lamp unit 10 is applied to the projector 1 having the liquid crystal panels 42R, 42G, 42B, the light source lamp unit may be applied to a projector having an optical modulator with a micro mirror.

EXAMPLES

The present invention will be more specifically described below with an Example and Comparisons.

Example

A plate body 19A corresponding to the profile of the reflector 12 was provided behind the reflector 12, and the light source lamp 11, the reflector 12 and the plate body 19A were housed in a box-shaped lamp housing 15A. Then, an exhaust fan 7 for drawing and discharging the air in the lamp housing 15A was provided on a side of the lamp housing 15A. The light source lamp 11 was then lit and the exhaust fan 7 was rotated to simulate the operation for observing temperature distribution.

Note that, the plate body 19A had an ellipsoidal curved shape corresponding to the profile of the reflector 12 and the dimension of the gap defined between the reflector 12 and the plate body 19A was approximately 9 mm.

Figure 4:
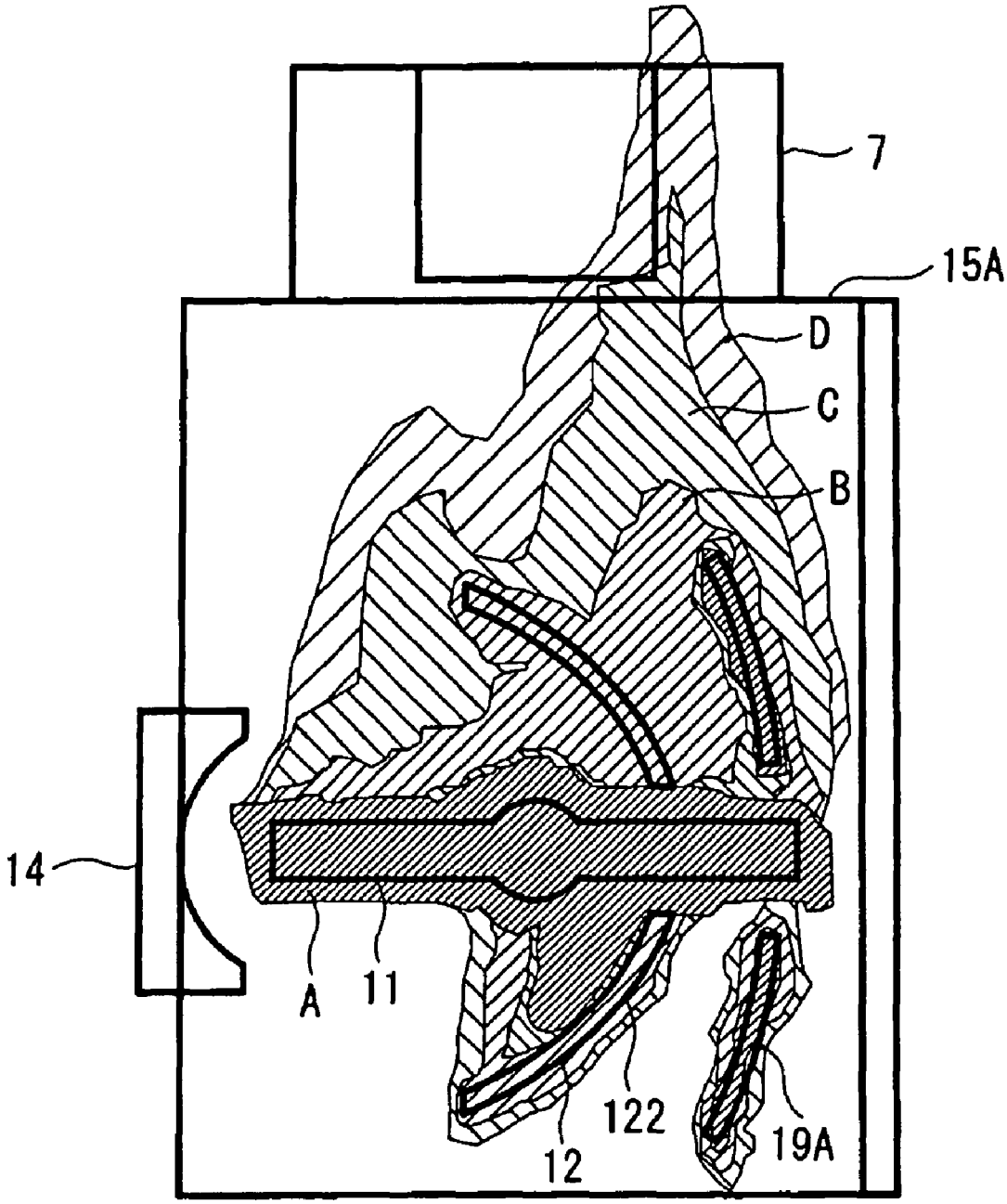
FIG. 4 is an illustration showing the result of a simulation of an Example.

The result is shown in FIG. 4.

Comparison 1

A plate body was not provided behind the reflector 12. Other conditions were the same as the Example.

Figure 5:
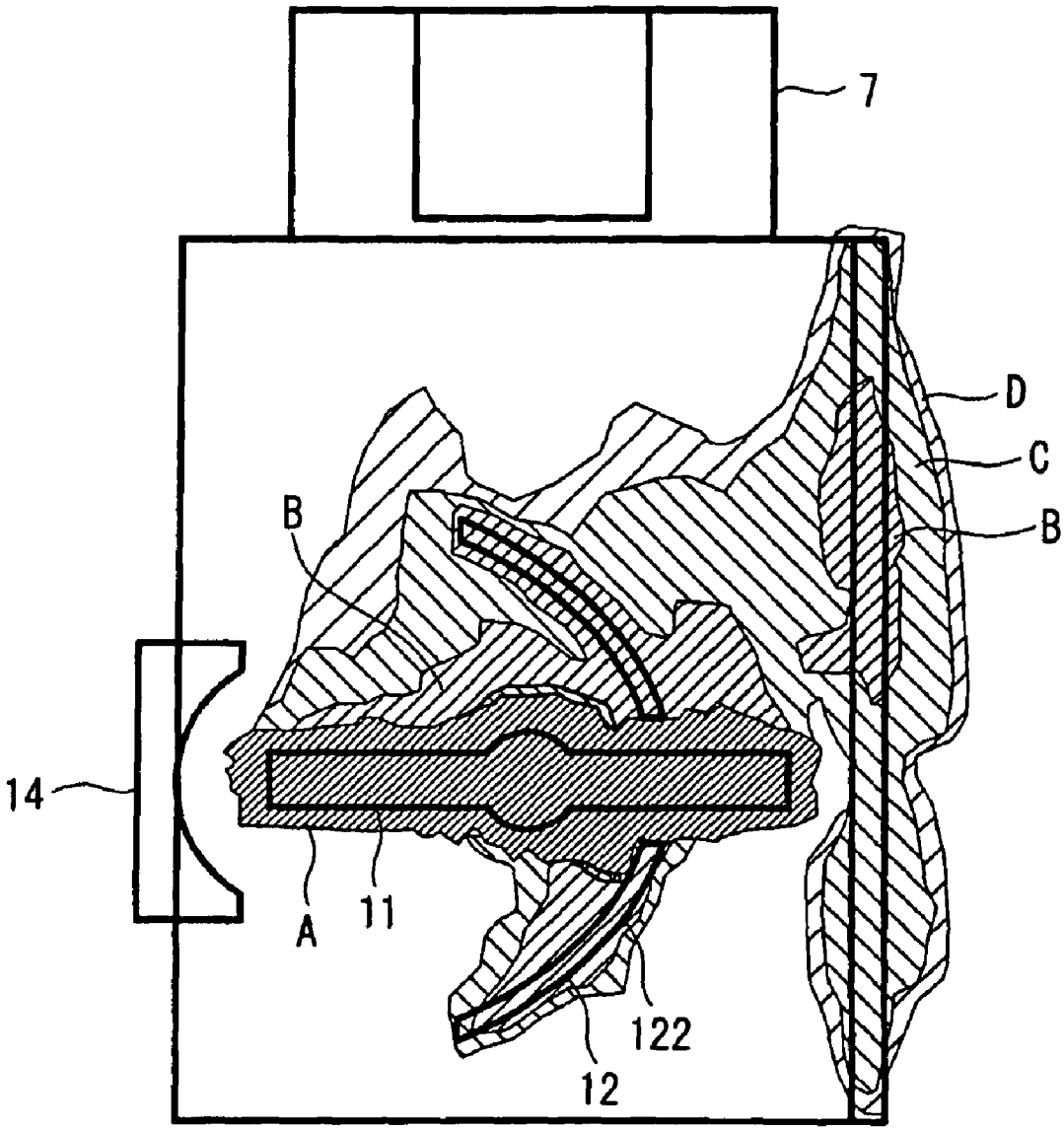
FIG. 5 is an illustration showing the result of a simulation of a Comparison 1.

The result of the simulation is shown in FIG. 5.

Comparison 2

A plate body 19B was provided behind the reflector 12. The plate body 19B was not along the profile of the reflector 12, but extended straight with being orthogonal to the optical axis of the light source lamp 11. The plate body 19B abutted on a part near the neck portion (not shown) of the reflecting portion 122 of the reflector 12. Other conditions were the same as the Example.

Figure 6:
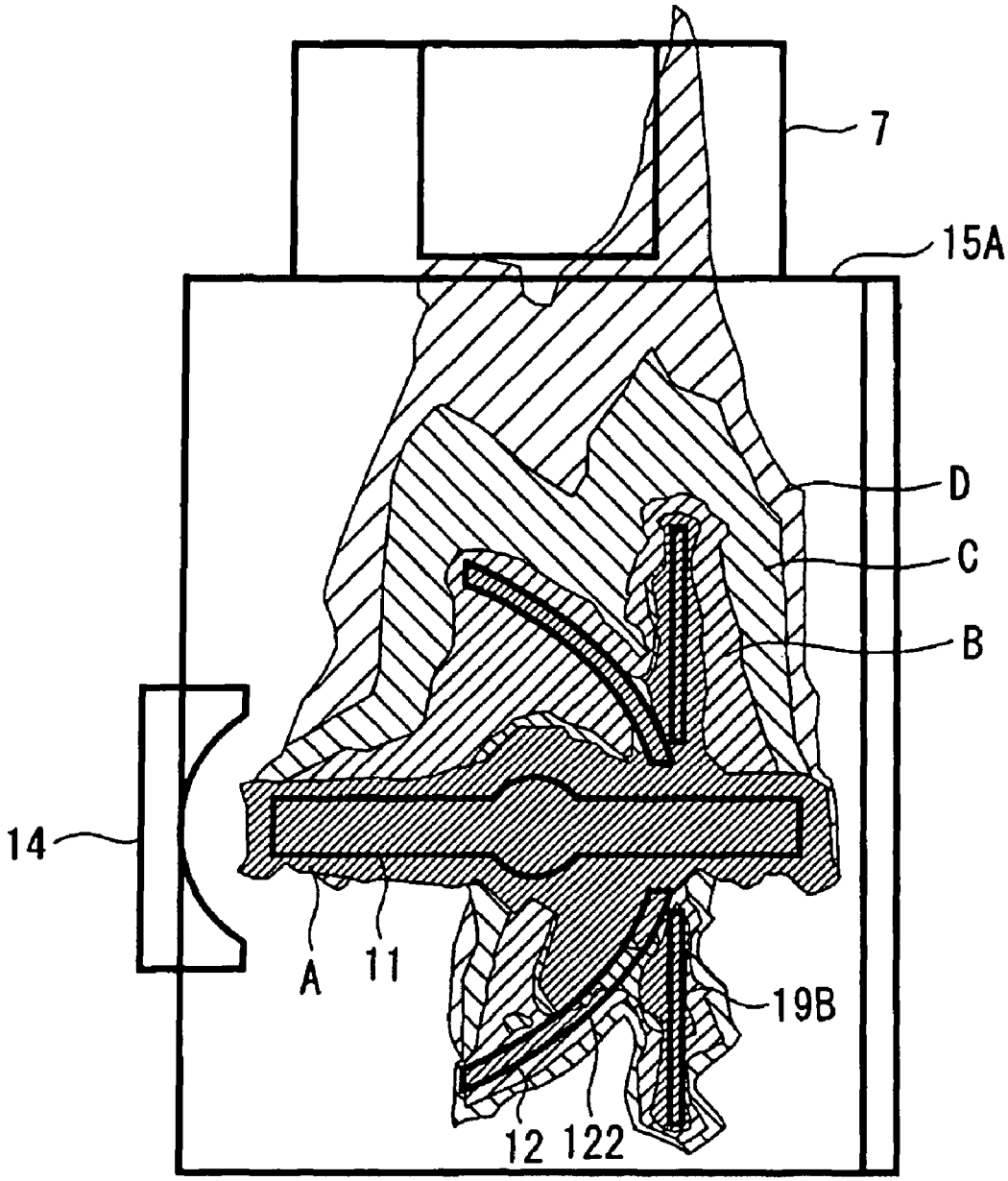
FIG. 6 is an illustration showing the result of a simulation of a Comparison 2.

The result of the simulation is shown in FIG. 6.

Comparison 3

The plate body 19B was provided behind the reflector 12 in the same manner as the Comparison 2. The gap defined between the plate body 19B and the part near the neck portion (not shown) of the reflecting portion 122 of the reflector 12 was approximately 3.5 mm. Other conditions were the same as the Comparison example 2.

Figure 7:
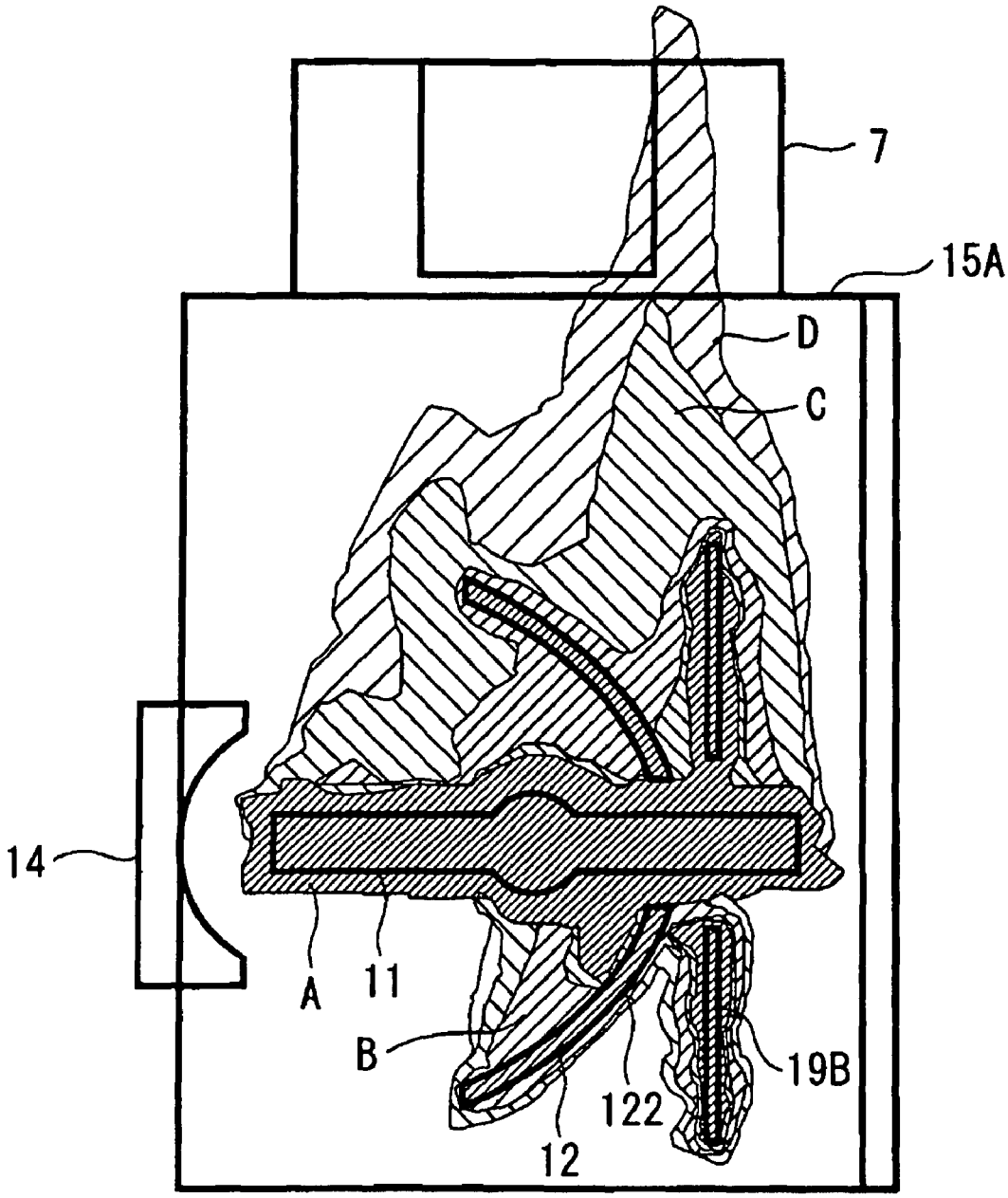
FIG. 7 is an illustration showing the result of a simulation of a Comparison 3.

The result of the simulation is shown in FIG. 7.

Incidentally, referring to FIGS. 4 to 7, the temperature, of an area A is approximately 180 to 140° C., that of an area B is approximately 139 to 90° C., that of an area C is approximately 89 to 50° C. and that of an area D is approximately 49 to 20° C.

(Comparison between Example and Comparisons 1 to 3)

In the Example, because the plate body 19A was provided, it was observed that the temperature of the wall behind the reflector 12 of the lamp housing 15A was not raised. Additionally, since the plate body 19A having a shape corresponding to the profile of the reflector 12 was provided, the reflector 12 could be efficiently cooled and it is observed that the temperature of the reflector 12 was approximately 139 to 90° C.

In the Comparison 1, since a plate body was not provided, the temperature of the wall behind the reflector 12 was raised.

Since the plate body 19B was provided in the Comparisons 2 and 3, the temperature of the wall arranged behind the reflector 12 of the lamp housing 15A was not raised. However, since the shape of the plate body 19B was not corresponded to the profile of the reflector 12, the reflector 12 was not efficiently cooled and the temperature of the reflector 12 was high (approximately 180 to 140° C.).

Though not specifically showing in FIGS. 6 and 7, when the gap is provided between the plate body 19B and the reflector 12 as in FIG. 7 (Comparison 3), the temperature of the reflector 12 was slightly lower than an arrangement where no gap is provided as in FIG. 6 (Comparison 2).

As described above, the effects of the present invention that the reflector can be efficiently cooled and the thermal deformation of the lamp housing and the light guide can be prevented could be confirmed.

What is claimed is:

1. A light source device, comprising:

a light-emitting tube including a light-emitting portion that generates light by an electric discharge between electrodes and sealing portions provided on both sides of the light-emitting portion; *and* a reflector provided behind the light-emitting portion of the light-emitting tube and having a reflecting portion that irradiates the light [beam] irradiated by the light-emitting tube after aligning in a predetermined direction, wherein [the reflecting portion of the reflector reflects visible lights and transmits infrared rays and ultraviolet rays in the light beam irradiated by the light-emitting portion of the light-emitting tube,] *a reflecting portion of the reflector reflects visible lights and transmits infrared rays in the light irradiated by the light-emitting portion of the light-emitting tube attached on the reflecting portion,* wherein a plate body is provided behind the reflector spaced apart from the reflecting portion of the reflector with a predetermined gap, the plate body having a shape corresponding to [the] *a* profile of the [reflection] *reflecting* portion of the reflector and absorbing the infrared rays [and the ultraviolet rays] transmitted through the reflecting portion, [and]

wherein a cooling channel that passes a cooling fluid is formed between the reflecting portion of the reflector and the plate body, and wherein the surface emissivity of the surface of the plate body is 0.8 or above on a side near the reflector.

2. The light source device according to claim 1, further comprising:

a neck portion provided on the reflecting portion of the reflector to support the sealing portions of the light-emitting portion, wherein the width of the cooling channel formed between the reflecting portion of the reflector and the plate body along an optical axis direction of the light-emitting portion is minimized at a part near the neck portion of the reflecting portion and enlarged toward a peripheral edge of the reflector.

3. The light source device according to claim 2, wherein the minimum width of the cooling channel is from 5 to 15 mm.

[4. The light source device according to claim 1, wherein the surface of the plate body has irregularities on a side near the reflector.]

[5. The light source device according to claim 1, further comprising:

a neck portion provided on the reflecting portion of the reflector to support the sealing portions of the light-emitting portion, wherein the plate body is made of a heat-conductive material and fixed on the neck portion of the reflector.]

6. The light source device according to claim 1, wherein in the sealing portions of the light-emitting tube, the one sealing portion provided on the side near the reflector is fixed on the reflector via a cylindrical heat-conductive member with one end extending behind the reflector, and wherein the plate body is made of a heat-conductive material and is abutted on an end of the heat-conductive member.

7. A projector that forms an optical image by modulating a light beam irradiated by a light source in accordance with image information and projects the optical image in an enlarged manner, the projector comprising:

the light source device according to claim 1.

8. The projector according to claim 7, further comprising:

a neck portion provided on the reflecting portion of the reflector to support the sealing portions of the light-emitting portion, wherein the width of the cooling channel formed between the reflecting portion of the reflector and the plate body along an optical axis direction of the light-emitting portion is minimized at a part near the neck portion of the reflecting portion and enlarged toward a peripheral edge of the reflector.

9. The projector according to claim 8, wherein the minimum width of the cooling channel is from 5 to 15 mm.

10. The projector according to claim 7, wherein the surface of the plate body has irregularities on a side near the reflector.

11. The projector according to claim 7, further comprising:

a neck portion provided on the reflecting portion of the reflector to support the sealing portions of the light-emitting portion, wherein the plate body is made of a heat-conductive material and fixed on the neck portion of the reflector.

12. The projector according to claim 7, wherein in the sealing portions of the light-emitting tube, the one sealing portion provided on the side near the reflector is fixed on the reflector via a cylindrical heat-conductive member with one end extending behind the reflector, and wherein the plate body is made of a heat-conductive material and is abutted on an end of the heat-conductive member.

13. A light source device, comprising:

a light-emitting tube including a light-emitting portion that generates light by an electric discharge between electrodes and sealing portions provided on both sides of the light-emitting portion; *and* a reflector provided behind the light-emitting portion of the light-emitting tube and having a reflecting portion that irradiates the light [beam] irradiated by the light-emitting tube after aligning in a predetermined direction, wherein [the reflecting portion of the reflector reflects visible lights and transmits infrared rays and ultraviolet rays in the light beam irradiated by the light-emitting portion of the light-emitting tube] *a reflecting portion of the reflector reflects visible lights and transmits infrared rays in the light irradiated by the light-emitting portion of the light-emitting tube attached on the reflecting portion*, wherein a plate body [having a shape corresponding to the profile of the reflecting portion of the reflector] is provided behind the reflector [with the outer circumference thereof being] spaced apart from the reflecting portion of the reflector with a predetermined gap, the plate body [being independent] *having a shape corresponding to a profile of the reflecting portion* of the reflector and absorbing the infrared rays [and the ultraviolet rays] transmitted through the reflecting portion, wherein a cooling channel that passes a cooling fluid is formed between the reflecting portion of the reflector and the plate body, wherein in the sealing portions of the light-emitting tube, the one sealing portion provided on the side near the reflector is fixed on the reflector via a cylindrical heat-conductive member with one end extending behind the reflector, and wherein the plate body is made of a heat-conductive material and is abutted on an end of the heat-conductive member.

14. The light source device according to claim 13, further comprising:

a neck portion provided on the reflecting portion of the reflector to support the sealing portions of the light-emitting portion, wherein the width of the cooling channel formed between the reflecting portion of the reflector and the plate body along an optical axis direction of the light-emitting portion is minimized at a part near the neck portion of the reflecting portion and enlarged toward a peripheral edge of the reflector.

[15. The light source device according to claim 14, wherein the minimum width of the cooling channel is from 5 to 15 mm.]

[16. The light source device according to claim 13, wherein the surface of the plate body has irregularities on a side near the reflector.]

17. A projector that forms an optical image by modulating a light beam irradiated by a light source in accordance with image information and projects the optical image in an enlarged manner, the projector comprising:

the light source device according to claim 13.

18. The projector according to claim 17, further comprising:

a neck portion provided on the reflecting portion of the reflector to support the sealing portions of the light-emitting portion, wherein the width of the cooling channel formed between the reflecting portion of the reflector and the plate body along an optical axis direction of the light-emitting portion is minimized at a part near the neck portion of the reflecting portion and enlarged toward a peripheral edge of the reflector.

[19. The projector according to claim 18, wherein the minimum width of the cooling channel is from 5 to 15 mm.]

[20. The projector according to claim 17, wherein the surface of the plate body has irregularities on a side near the reflector.]

*21. A light source device comprising:*

*a light-emitting tube including a light-emitting portion that generates light by an electric discharge between electrodes;*

*a reflector provided behind the light-emitting portion of the light-emitting tube and having a reflecting portion that irradiates the light irradiated by the light-emitting tube; and*

*a lamp housing that houses the light-emitting tube and the reflector,*

*wherein a reflecting portion of the reflector reflects visible lights and transmits infrared rays in the light irradiated by the light-emitting portion of the light-emitting tube is attached on the reflecting portion,*

*wherein a plate body is provided behind the reflector spaced apart from the reflecting portion of the reflector with a predetermined gap, the plate body having a shape corresponding to a profile of the reflecting portion of the reflector and absorbing the infrared rays transmitted through the reflecting portion,*

*wherein the lamp housing has a fixing section that positions the reflector in an optical axis direction,*

*wherein the plate body is fixed to the fixing section,*

*wherein a cooling channel that passes a cooling fluid is formed between the reflecting portion of the reflector and the plate body, and*

*wherein the surface emissivity of the surface of the plate body is 0.8 or above on a side near the reflector.*

*22. The light source device according to claim 21, wherein the fixing section has a fixing portion which fixes the plate body, and the plate body is fixed to the fixing portion.*

*23. A projector that forms an optical image by modulating a light irradiated by a light source in accordance with image information and projects the optical image in an enlarged manner, the projector comprising:*

*the light source device according to claim 21.*

*24. The projector according to claim 23, further comprising:*

*a neck portion provided on the reflecting portion of the reflector to support sealing portions provided on both sides of the light-emitting portion,*

*wherein a width of the cooling channel formed between the reflecting portion of the reflector and the plate body along the optical axis direction of the light-emitting*

*portion is smaller at a part near the neck portion of the reflecting portion than at a part near a peripheral edge of the reflector.*

*25. The projector according to claim 23,*

*wherein a width of the cooling channel formed between the reflecting portion of the reflector and the plate body along the optical axis direction of the light-emitting portion is a minimum at a part near a neck portion of the reflecting portion that supports the light-emitting tube, and a maximum at a peripheral edge of the reflector.*

*26. The projector according to claim 23,*

*wherein a width of the cooling channel formed between the reflecting portion of the reflector and the plate body along the optical axis direction of the light-emitting portion is minimized at a part near a neck portion of the reflecting portion that supports the light-emitting tube and enlarged toward a peripheral edge of the reflector.*

*27. The projector according to claim 23, further comprising:*

*an exhaust fan that blows a cooling air along a direction orthogonal to the optical axis direction to let the cooling air pass through the cooling channel, and an exhaust port from which the cooling air from the exhaust fan is discharged.*

*28. The projector according to claim 27,*

*wherein the exhaust fan draws in the cooling air inside the projector.*

*29. The projector according to claim 23, further comprising:*

*a fan that blows a cooling air along a direction orthogonal to the optical axis direction to let the cooling air pass through the cooling channel.*

*30. The projector according to claim 29,*

*wherein the fan draws in the cooling air inside the projector.*

*31. The projector according to claim 23, wherein*

*the lamp housing is configured in an L-shape formed by the fixing section and a horizontal portion that is fixed to the base of the projector, and*

*the plate body is fixed to an upper side of the fixing section that is opposite to an end of the fixing section connected to the horizontal portion.*

*32. The projector according to claim 31, wherein*

*a projection is formed on the upper side of the fixing section opposite the end of the fixing section connected to the horizontal portion, and the plate body is fixed to the projection.*

*33. The projector according to claim 23,*

*wherein the reflecting portion of the reflector transmits ultraviolet rays in the light irradiated by the light emitting portion of the light-emitting tube, and*

*wherein the plate body inhibits the ultraviolet rays from being transmitted through the reflecting portion.*

*34. The projector according to claim 23, wherein*

*a cover portion is provided on a front side of the reflector.*

*35. The projector according to claim 34, wherein*

*the cover portion is formed in an approximately conical cylinder.*

*36. The projector according to claim 34, wherein*

*the cover portion is attached to an opening of the fixing section of the lamp housing.*

*37. The projector according to claim 34, wherein*

*the cover portion is made of a heat absorbing material.*

*38. The projector according to claim 34, wherein*

*ultraviolet rays that are radiated forward of the light-emitting portion are inhibited by the cover portion.*

*39. The projector according to claim 34,*

*wherein a fan blows the cooling air to the cover portion.*

*40. The light source device according to claim 21,*

*wherein a minimum width of the cooling channel is from 5 to 15 mm.*

*41. The projector according to claim 23,*

*further comprising a neck portion configured on the reflector such that the neck portion supports the light-emitting tube,*

*wherein a width of the cooling channel between a part near the neck portion and the plate body along the optical axis direction of the light-emitting portion is from 5 to 15 mm.*

*42. The projector according to claim 23,*

*further comprising sealing portions provided on the light-emitting tube,*

*wherein one sealing portion provided on a side near the reflector is fixed to the reflector via a cylindrical heat-conductive member with one end of the sealing portion extending behind the reflector, and wherein the plate body is made of a heat-conductive material and is abutted on an end of the heat-conductive member.*

*43. The light source device according to claim 21, wherein the fixing section consists of a vertical portion.*

*44. A projector comprising:*

*a light-emitting tube including a light-emitting portion that generates light by an electric discharge between electrodes and sealing portions provided on both sides of the light-emitting portion;*

*a reflector provided behind the light-emitting portion of the light-emitting tube and having a reflecting portion that irradiates the light irradiated by the light-emitting tube after aligning in a predetermined direction; and*

*a lamp housing that houses the light-emitting tube and the reflector,*

*wherein a reflecting portion of the reflector reflects visible lights and transmits infrared rays in the light irradiated by the light-emitting portion of the light-emitting tube, the light-emitting tube being attached on the reflecting portion,*

*wherein a plate body is provided behind the reflector spaced apart from the reflecting portion of the reflector with a predetermined gap, the plate body having a shape corresponding to a profile of the reflecting portion of the reflector and absorbing the infrared rays transmitted through the reflecting portion,*

*wherein the lamp housing has a fixing section that positions the reflector in an optical axis direction,*

*wherein the plate body is fixed to the fixing section,*

*wherein a fan blows a cooling air between the reflecting portion of the reflector and the plate body, and*

*wherein the surface emissivity of the surface of the plate body is 0.8 or above on a side near the reflector.*

*45. A projector comprising:*

*a light-emitting tube including a light-emitting portion that generates light by an electric discharge between electrodes and sealing portions provided on both sides of the light-emitting portion;*

*a reflector provided behind the light-emitting portion of the light-emitting tube and having a reflecting portion that irradiates the light irradiated by the light-emitting tube after aligning in a predetermined direction; and*

*a lamp housing that houses the light-emitting tube and the reflector,*

*wherein a reflecting portion of the reflector reflects visible lights and transmits infrared rays in the light irradiated*

*by the light-emitting portion of the light-emitting tube, the light-emitting tube being attached on the reflecting portion,*

*wherein a plate body is provided behind the reflector spaced apart from the reflecting portion of the reflector with a predetermined gap, the plate body having a shape corresponding to a profile of the reflecting portion of the reflector and absorbing the infrared rays transmitted through the reflecting portion,*

*wherein the lamp housing has a fixing section that positions the reflector in an optical axis direction,*

*wherein the plate body is fixed to the fixing section,*

*wherein a fan blows a cooling air between the reflecting portion of the reflector and the plate body, and*

*wherein the minimum width of the cooling channel is from 5 to 15 mm.*

*46. The projector according to claim 44, wherein the fixing section consists of a vertical portion.*

*47. A projector comprising:*

*a light-emitting tube including a light-emitting portion that generates light by an electric discharge between electrodes and sealing portions provided on both sides of the light-emitting portion; and*

*a reflector provided behind the light-emitting portion of the light-emitting tube and having a reflecting portion that irradiates the light irradiated by the light-emitting tube after aligning in a predetermined direction,*

*wherein a reflecting portion of the reflector reflects visible lights and transmits infrared rays in the light irradiated by the light-emitting portion of the light-emitting tube attached on the reflecting portion,*

*wherein a plate body is provided behind the reflector spaced apart from the reflecting portion of the reflector with a predetermined gap, the plate body having a shape corresponding to a profile of the reflecting portion of the reflector and absorbing the infrared rays transmitted through the reflecting portion,*

*wherein a cooling channel that passes a cooling fluid is formed between the reflecting portion of the reflector and the plate body, and*

*wherein the minimum width of the cooling channel is from 5 to 15 mm.*

*48. A projector comprising:*

*a light-emitting tube including a light-emitting portion that generates light by an electric discharge between electrodes;*

*a reflector provided behind the light-emitting portion of the light-emitting tube and having a reflecting portion that irradiates the light irradiated by the light-emitting tube; and*

*a lamp housing that houses the light-emitting tube and the reflector,*

*wherein a reflecting portion of the reflector reflects visible lights and transmits infrared rays in the light irradiated by the light-emitting portion of the light-emitting tube attached on the reflecting portion,*

*wherein a plate body is provided behind the reflector spaced apart from the reflecting portion of the reflector with a predetermined gap, the plate body having a shape corresponding to a profile of the reflecting portion of the reflector and absorbing the infrared rays transmitted through the reflecting portion,*

*wherein the lamp housing has a fixing section that positions the reflector in an optical axis direction,*

*wherein the plate body is fixed to the fixing section,*

*wherein a cooling channel that passes a cooling fluid is formed between the reflecting portion of the reflector and the plate body, and*

*wherein the minimum width of the cooling channel is from 5 to 15 mm.*

* * * * *